US 8,482,462 B2

(12) United States Patent
Komijani et al.

(10) Patent No.: US 8,482,462 B2
(45) Date of Patent: Jul. 9, 2013

(54) MULTI-ANTENNA BEAM-FORMING SYSTEM FOR TRANSMITTING CONSTANT ENVELOPE SIGNALS DECOMPOSED FROM A VARIABLE ENVELOPE SIGNAL

(75) Inventors: Abbas Komijani, Mountain View, CA (US); Aliazam Abbasfar, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 11 days.

(21) Appl. No.: 12/573,492

(22) Filed: Oct. 5, 2009

(65) Prior Publication Data

US 2010/0149039 A1 Jun. 17, 2010

Related U.S. Application Data

(63) Continuation of application No. PCT/US2008/064572, filed on May 22, 2008.

(60) Provisional application No. 60/931,699, filed on May 25, 2007.

(51) Int. Cl.
*H01Q 3/00* (2006.01)
*H01Q 3/26* (2006.01)

(52) U.S. Cl.
USPC ......... 342/372; 342/375; 455/562.1; 375/296

(58) Field of Classification Search
USPC ......... 342/372, 375; 455/562.1; 375/295–297
See application file for complete search history.

(56) References Cited

U.S. PATENT DOCUMENTS

| | | | | |
|---|---|---|---|---|
| 5,612,702 A * | 3/1997 | Kinsey | | 342/427 |
| 5,759,107 A | 6/1998 | Nagel | | |
| 7,555,059 B2 * | 6/2009 | Rybicki et al. | | 375/297 |
| 2006/0083195 A1 | 4/2006 | Forenza et al. | | 370/328 |
| 2006/0104384 A1 | 5/2006 | Sorrells | | |
| 2008/0080631 A1 | 4/2008 | Forenza et al. | | 375/260 |
| 2008/0118004 A1 | 5/2008 | Forenza et al. | | 375/299 |
| 2008/0130790 A1 | 6/2008 | Forenza et al. | | 375/299 |
| 2008/0273618 A1 | 11/2008 | Forenza et al. | | 375/261 |
| 2009/0117863 A1 * | 5/2009 | Birafane | | 455/108 |

FOREIGN PATENT DOCUMENTS

| | | |
|---|---|---|
| EP | 1677417 A1 | 7/2006 |
| JP | 07162224 | 6/1995 |
| JP | 2004253955 A | 9/2004 |

(Continued)

OTHER PUBLICATIONS

International Application, WO 82/04469, Dec. 23, 1982, "Improvements Relating to Rotational Devices".

(Continued)

*Primary Examiner* — Cassie Galt
(74) *Attorney, Agent, or Firm* — Barcelo, Harrison & Walker LLP (57) ABSTRACT

Embodiments in the present disclosure pertain to a multi-antenna beam-forming system for transmitting constant envelope signals decomposed from a variable envelope signal. The variable envelope signal is decomposed into two constant envelope signals. Each of the constant envelope signals are separately amplified by power amplifiers and transmitted over separate antennas. Beam steering delays can be added to the transmit paths of the constant envelope signals to direct the beam to the location of a receiver. The transmitted constant envelope signals combine through spatial out-phasing such that a receiving antenna receives a variable envelope signal.

13 Claims, 9 Drawing Sheets

FOREIGN PATENT DOCUMENTS

| | | | |
|---|---|---|---|
| JP | 2006129402 A | 5/2006 | |
| WO | 03103166 A1 | 12/2003 | |
| WO | 2008064572 A1 | 6/2008 | |

OTHER PUBLICATIONS

Shi, Bo et al., "A Novel Design Using Translinear Circuit for Linear Linc Transmitters", pp. I-64-I-67, ISCAS 2000-IEEE International Symposium on Circuits and Systems, May 28-31, 2000, Geneva, Switzerland.

Lee, Dora et al., "Beamforming System for 3G and 4G Wireless LAN Applications", Circuit Theory and Design, 2005, Proceedings of the 2005 European Conference on Cork, Ireland Aug. 29, IEEE vol. 3, pp. 137-140, XP010845434.

Cox, D.C. "Linear Amplification With Nonlinear Components", IEEE International Symposium on Circuits and Systems, Apr. 24, 1974, pp. 157-161, XP000997101.

Andreas F. Molisch, "Space-Time-Frequency (STF) Coding for MIMO-OFDM Systems", IEEE Communications Letters, vol. 6, No. 9, Sep. 2002.

Steve Perlman, "Distributed-Input-Distributed-Output (DIDO) Wireless Technology a New Approach to Multiuser Wireless", Rearden LLC/Patents Pending. pp. 1-19.

Notification concerning Transmittal of International Preliminary Report on Patentability (Chapter I) including the Written Opinion of the Int'l. searching Authority with mail date of Dec. 10, 2009 re Int'l. Application No. PCT/US2008/064572. 9 pages.

EP Office Communication Pursuant to Article 94(3) EPC for Application No. 08 769 633.2-2411 dated Jul. 19, 2010. 4 pages.

EP Response dated Jan. 18, 2011 to the Official Communication dated Jul. 19, 2010 re EP Application No. 08769633.2. 19 Pages.

JP Office Action dated Sep. 29, 2011 re JP Application No. 2010-509557. 6 Pages.

JP Office Action dated Jun. 1, 2012 re JP Application No. 2010-509557. 4 pages.

\* cited by examiner

MULTI-ANTENNA BEAM-FORMING SYSTEM FOR TRANSMITTING CONSTANT ENVELOPE SIGNALS DECOMPOSED FROM A VARIABLE ENVELOPE SIGNAL

BACKGROUND

Constant envelope signals are a popular way for transmitting wireless or over-the-air radio frequency (RF) signals. For a constant envelope signal, the envelope of the carrier wave does not change in response to changes in the modulated signal. In other words, the maximum and minimum amplitude of a constant envelope signal is kept at a constant level. Constant envelope signaling schemes are advantageous in that they are efficient from a transmitted power standpoint. This is because constant envelope signals allow a transmitter's power amplifiers to operate at or near saturation levels, which correspond to the point whereby the power amplifiers operate at peak efficiency. Furthermore, due to the fact that the amplitude is maintained at a constant level, the power amplifiers only have to provide a steady amount of amplification. Consequently, there are less non-linearities and signal distortions associated with the amplification of constant envelope signals.

In contrast, variable envelope signals have envelopes that change over time. Variable envelope signals can transmit a greater amount of data for the same occupied frequency bandwidth over a given amount of time as compared to constant envelope signals. This results in improved spectral efficiency. Unfortunately, power amplifiers for amplifying variable envelope signals operate at an average power level which is significantly less than their peak power. This means that the power amplifiers are mostly operating at a point which is less than ideal. This reduces the power efficiency of these variable envelope power amplifiers. Furthermore, power amplifiers for variable envelope signals change the signals' amplitudes by varying amounts, depending on the instantaneous amplitudes of the signals. The greater the degree that the amplitude of a signal varies, the more non-linear amplification is exhibited. This non-linear amplification produces distortions in the variable envelope signal and non-idealities in the channel. Such distortions and non-idealities could cause errors in the receiver. The received data could become corrupted, and the transmitted distorted signal will experience spectral regrowth.

Thus, wireless communications designers face a dilemma. The designers can implement constant envelope signals, which are highly efficient from a power standpoint and are also less susceptible to distortions. However, the trade-off is that constant envelope signals cannot transmit data as fast as compared to variable envelope signals. Although variable envelope signals have better spectral efficiency, this comes at the expense of reduced power efficiency and increased susceptibility to signal distortions and non-idealities which could ultimately lead to receiver errors and unacceptable out-of-band spectral emissions.

BRIEF DESCRIPTION OF THE DRAWINGS

The accompanying drawings, that are incorporated in and form a part of this specification, illustrate embodiments discussed below, and, together with the description, serve to explain the principles of the disclosure.

DETAILED DESCRIPTION

Embodiments in the present disclosure pertain to a multi-antenna beam-forming system. Initially, a variable envelope signal is decomposed into two constant envelope signals through a process known as out-phasing. The out-phasing process provides two signals of constant amplitude but of varying phase (e.g., "phasor fragments") to represent a single signal of varying phase and amplitude. Each of the two constant envelope signals is amplified by a power amplifier and then transmitted wirelessly as an RF signal by a transmitting antenna. Because the power amplifiers are amplifying constant envelope signals, transmit power efficiency is achieved while any non-linearities associated with the power amplifiers are minimized. The two constant envelope RF signals propagate over-the-air and are received by a one or more receiving antenna. The combination of the two constant envelope RF signals received by one or more receiving antennas produces a variable envelope signal which matches that of the initial variable envelope signal before it was decomposed. The received variable envelope signal results in superior spectral efficiency. Thereby, the benefits associated with constant envelope signals and with variable envelope signals schemes are realized, while their drawbacks are overcome. In one embodiment, a delay can be introduced in the transmit path of one or more antennas to help steer the transmit signal to the location of a designated receiver antenna.

Figure 1:
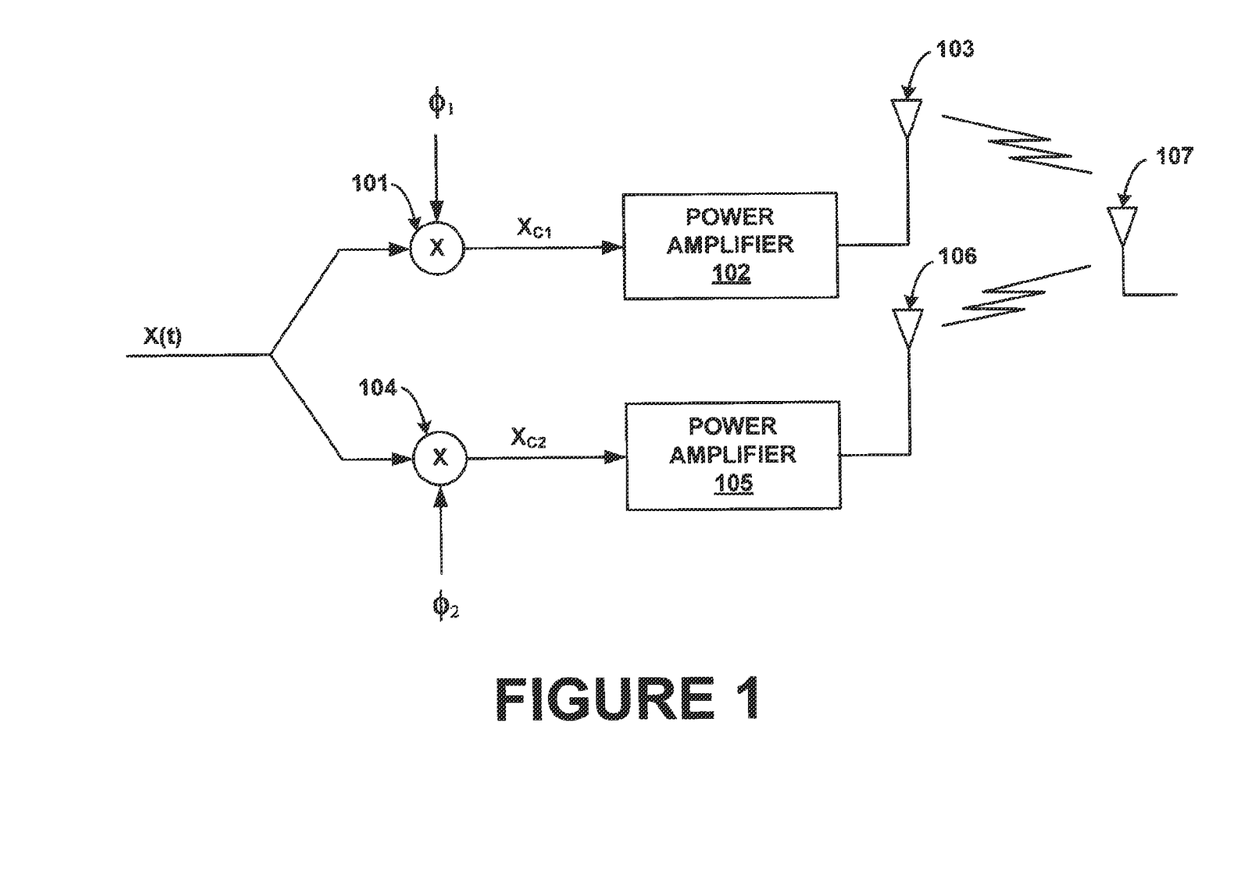
FIG. 1 shows an example of a system for transmitting a variable envelope signal as two constant envelope signals over two transmitter antennas.

Referring now to FIG. 1, an example of a system for transmitting a variable envelope signal as two constant envelope signals over two transmitter antennas is shown. A variable envelope signal X(t) has changes in both amplitude and phase. The variable envelope signal X(t) is decomposed into two constant envelope signals $X_{c1}$ and $X_{c2}$. This is accomplished by inputting the variable envelope signal X(t) into two mixers 101 and 104. Mixer 101 changes the phase of the X(t) signal by $\phi_1$ to produce a constant envelope signal Xc1. The constant envelope signal Xc1 has a constant amplitude, but its phase varies as a function of X(t). The constant envelope signal Xc1 is input to a power amplifier 102. Power amplifier 102 amplifies the constant envelope signal Xc1, which is then transmitted by antenna 103 over-the-air as an RF signal to a receiver antenna 107. In similar fashion, mixer 104 changes the phase of the variable envelope signal X(t) by $\phi_2$ to produce the constant envelope signal Xc2. The constant envelope signal Xc2 has a constant amplitude, but its phase varies as a function of X(t). The constant envelope Xc2 signal is input to power amplifier 105. Power amplifier 105 amplifies the constant envelope signal Xc2, which is then transmitted by antenna 106 over-the-air as an RF signal to receiver antenna 107. The two RF signals being transmitted by transmitter antenna 103 and 106 combine through superposition over-the-air, and the receiver antenna 107 receives a variable envelope signal that corresponds to the original variable envelope signal X(t). This type of combining at least two constant envelope signals over-the-air to form a variable envelope signal is referred to herein as "spatial out-phasing."

In this embodiment, there is no need to have a physical adder circuit to add the two constant envelope signals together before RF transmission. The constant envelope signals are separately amplified by separate power amplifiers, and each of the amplified constant envelope signals are transmitted wirelessly by their own dedicated antenna. In other embodiments, any number of different types and designs of phase delay circuits, mixers, amplifiers, converters, switches, and other components can be used to implement the decomposition process. Furthermore, from the receiver side, no changes or modifications are needed. This provides for a standard-blind solution, whereby the multi-antenna system for transmitting constant envelope signals decomposed from a variable envelope signal will work for virtually any conventional receiver system.

Figure 2:
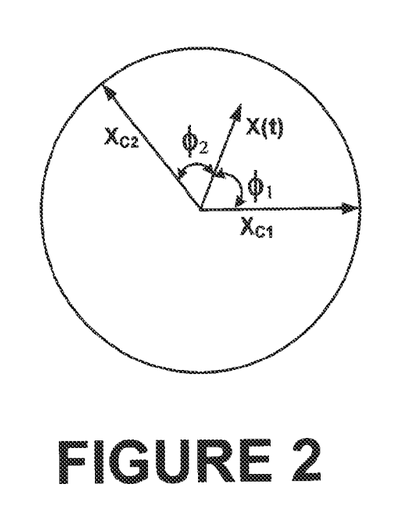
FIG. 2 shows a vector diagram used to illustrate the decomposition process used to perform spatial out-phasing.

FIG. 2 shows a vector diagram used to illustrate the decomposition process used to perform spatial out-phasing. Three vectors are shown. One vector represents the variable envelope signal X(t). The length of the X(t) vector represents the amplitude of the variable envelope signal. The angle of the X(t) vector represents the phase of the variable envelope signal. The amplitude and phase of the variable envelope signal may change. Consequently, the length and angle of the X(t) vector can change. The X(t) vector can be decomposed into two vectors Xc1 and Xc2. The Xc1 and Xc2 vectors represent constant envelope signals. For constant envelope signals, the amplitudes do not change. The amplitudes of the constant envelope signals are denoted by the lengths of the Xc1 and Xc2 vectors. Consequently, the lengths of the Xc1 and Xc2 vectors are kept constant. The angles of the Xc1 and Xc2 vectors represent their respective phases. By applying vector arithmetic, one can calculate the angles ($\phi$1 and $\phi$2) for the Xc1 and Xc2 vectors such that when the Xc1 vector is combined with the Xc2 vector, the result is the X(t) vector. Any change in the phase of the variable envelope signal is represented by a corresponding change in the angle of the X(t) vector. This means that the angles, $\phi$1 and $\phi$2, of the Xc1 and Xc2 vectors are changed (e.g., $\phi$1 decreases while $\phi$2 increases or $\phi$1 decreases while $\phi$2 increases) in response to the change in the angle of the X(t) vector. The lengths of the Xc1 and Xc2 vectors need not be changed and can be kept constant. Consequently, changes in phase of a variable envelope signal are represented by changing the phases of the two corresponding constant envelope signals.

Any change in the amplitude of the variable envelope signal is represented by a corresponding change in the length of the X(t) vector. This, in turn, causes the angles of the constant envelope to change accordingly, as represented by the angles of the Xc1 and Xc2 vectors. For example, if the amplitude of the variable envelope signal were to decrease, this would be represented by a shorter X(t) vector. Decomposing a shorter X(t) vector entails changing the angles, $\phi$1 and $\phi$2, of the Xc1 and Xc2 vectors. In particular, the angles, $\phi$1 and $\phi$2, are increased when the length of the X(t) signal decreases. The lengths of the Xc1 and Xc2 vectors cannot be shortened because they represent constant envelop signals having constant amplitudes. Conversely, when the amplitude of the variable envelope signal increases, the angles, $\phi$1 and $\phi$2, of the constant envelope vectors Xc1 and Xc2 are decreased. Consequently, any changes in the amplitude of a variable envelope signal are represented by changing the phases of the two corresponding constant envelope signals. Therefore, changes in either amplitude or phase of a variable envelope signal are represented by changing the phases of the decomposed pair of constant envelope signals. Additional descriptions of decomposition and out-phasing can be found in Behzad Razavi, *RF Microelectronics*, Prentice Hall PTR, Nov. 6, 1997 (see Section 9.5.4 relating to "linear amplification with nonlinear components" (LINC)).

Figure 3:
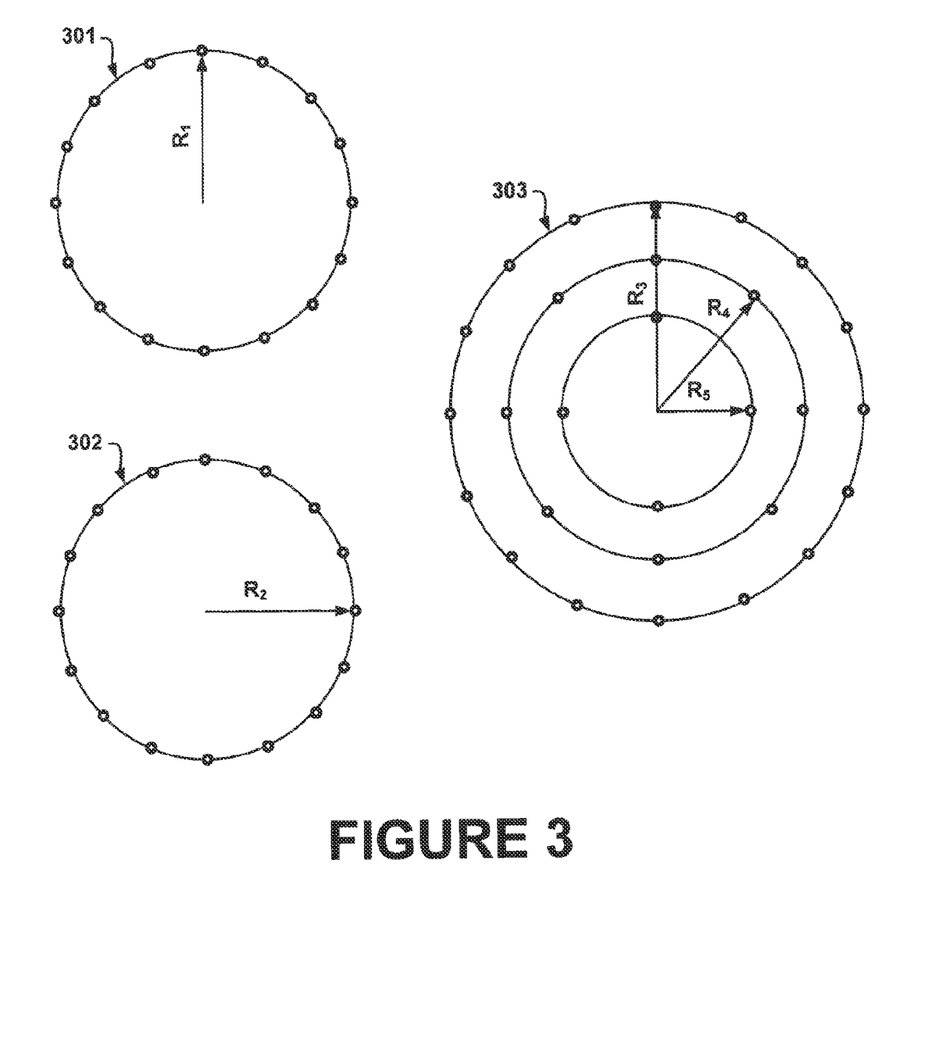
FIG. 3 shows constellations for transmitter antennas transmitting constant envelope signals and the constellation for a receiver antenna which receives an equivalent variable envelope signal.

Although the transmitter antennas are transmitting constant envelope signals, the receiver antenna receives a variable envelope signal. This is illustrated in FIG. 3, which shows the constellations for the transmitter antennas and the constellation for the receiver antenna. The constellation for one of the two transmitter antennas is depicted as 301. The symbols are arranged equi-distant from the center, which indicates that a constant envelope signal having a constant amplitude is being transmitted. The phase of the constant envelope signal can vary, as indicated by the various symbols located along the same radius, R1, of the constellation. The constellation for the other transmitter antenna is depicted as 302. Constellation 302 has a constant radius of R2. In one embodiment, R1=R2. In other embodiments, R1 and R2 can be different. The symbols of constellation 302 are arranged equi-distant to the center by the radius R2. This indicates that a constant envelope signal having a constant amplitude, but varying phases, is being transmitted by the other transmitter antenna.

Figure 4:
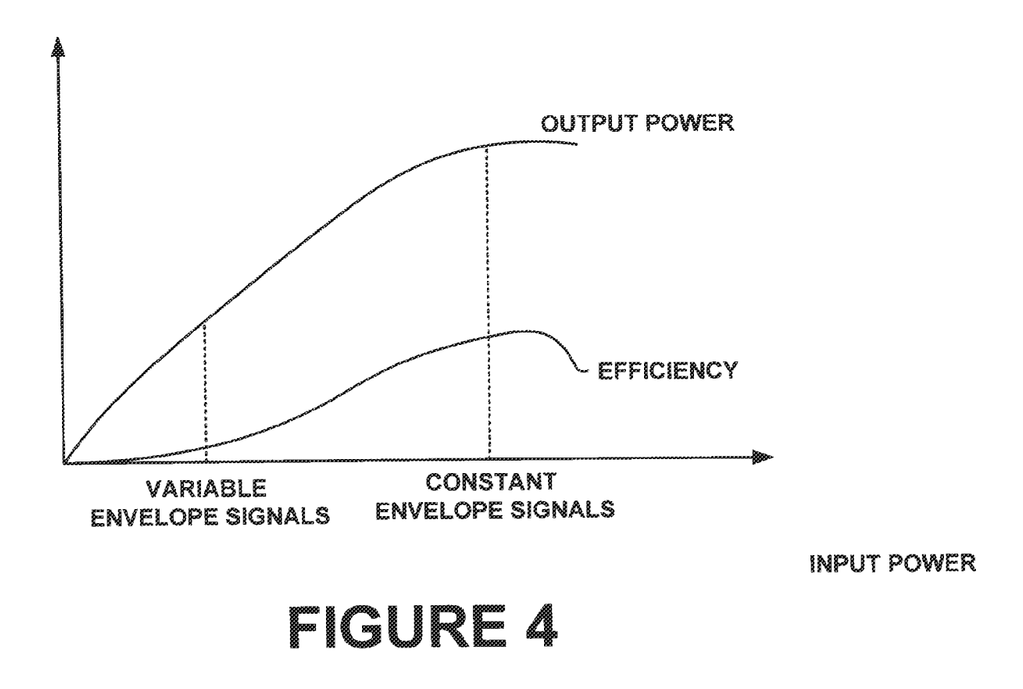
FIG. 4 shows a graph of output power and efficiency as functions of input power for a typical transmitter power amplifier.

The constellation for the receiver antenna is depicted as 303. Constellation 403 has symbols arranged along circles with different radii (R3, R4, and R5). The different radii indicates that the amplitude of the received signal varies over time. Furthermore, the symbols are arranged along various points of the circles. This means that the phase of the received signal also varies over time. Consequently, constellation 303 shows a received variable envelope signal. The two transmitted signals having constellations 301 and 302 are combined over-the-air, through a process herein referred to as spatial out-phasing, and results in an antenna receiving a signal that corresponds to constellation 303, which characterizes a variable envelope signal. Thus, a higher rate of data (e.g., greater bits per second) is being received by the receiver antenna as compared to a receiver that simply receives a constant envelope signal. Furthermore, because the transmitter's power amplifiers are amplifying constant envelope signals instead of variable envelope signals, power amplifier nonlinearities are minimized. Thus, the receiver constellation 303 is uniform, and receiver errors are minimized. It should be noted that because the transmitter's power amplifiers are amplifying constant envelope signals (i.e., Xc1 and Xc2), these amplifiers can operate at or near their saturation level. This means that the transmitter's power amplifiers are operating at or near their peak efficiency. FIG. 4 shows a graph of the output power and efficiency as functions of input power for a typical transmitter power amplifier. For constant envelope signals, the amplitude is constant. Consequently, the average power for constant envelope signals is approximately equal to its peak power. This corresponds to higher efficiency. Conversely, because the amplitude of the variable envelope signal varies over time, its average power is less than that of its peak power. Its average power is backed off from its peak. This results in a lower power efficiency. For a typical power amplifier, the efficiency for variable envelope signals can be 5%, whereas the typical efficiency for constant envelope signals can be 50%. Thus, by decomposing variable envelope signals into constant envelope signals, embodiments of the present disclosure can improve power amplifier efficiency by upwards of ten-fold.

Figure 5:
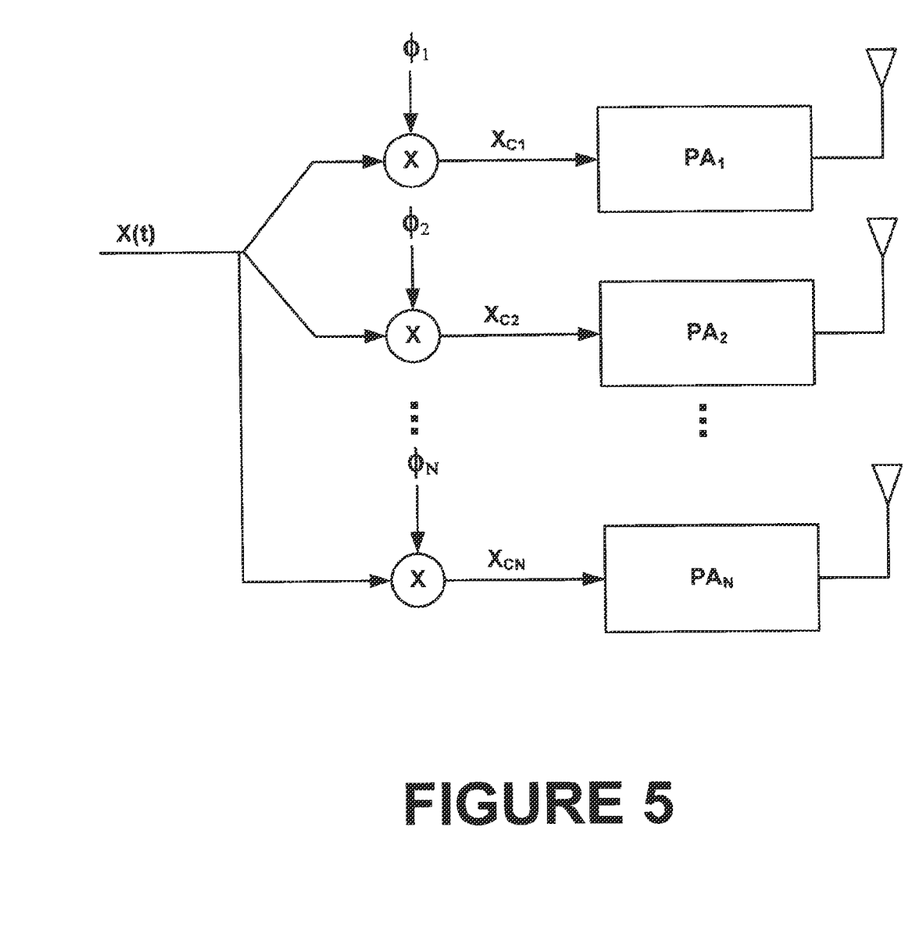
FIG. 5 shows a multi-antenna system having N number of transmitter antennas for transmitting N number of constant envelop signals, which represent an initial variable envelope signal.

In other embodiments, more than two transmitter antennas are utilized. In one embodiment, the variable envelope signal is decomposed into three or more constant envelope signals, each of which is separately amplified by power amplifiers and sent over-the-air as RF signals by transmitter antennas. FIG. 5 shows a multi-antenna system having N number of transmitter antennas for transmitting N number of constant envelop signals which represent an initial variable envelope signal. The initial variable envelope signal X(t) is simultaneously input to N number of mixers. The N number of mixers independently changes the phase by $\phi_1$ to $\phi_N$. The outputs from the mixers are N number of constant envelope signals, $X_{c1}$ to $X_{cN}$. Each of these N number of constant envelope signals are amplified by N number of power amplifiers, $PA_1$ to $PA_N$, and then transmitted as RF signals by the N number of antennas. There may be cost, power, signal integrity, and/or bandwidth reasons for decomposing and out-phasing more than two constant envelope signals.

The multi-antenna systems of the above embodiments are applicable to circumstances whereby the receiver antenna is located equi-distant from each of the transmitter antennas. If one or more of the transmitter antennas are located farther away from the receiver antenna than the other transmitter antenna, the constant envelope signal corresponding to the transmitter antenna(s) that are further away will take longer to reach the receiver antenna. This extra delay may cause errors in phase to occur. One solution is to introduce extra delay(s) in the transmit path(s) corresponding to the closer transmitter antenna(s) so that their constant envelope signal will synchronize and arrive "on time" with that of the constant envelope signal of the transmitter antenna that is further away. For example, if there are two transmitter antennas with one transmitter antenna driven by $X_{c1}(t)$, and the other transmitter antenna driven by $X_{c2}(t)$, then at the receiver antenna, the summation is correct if the delays from the two transmitter antennas are the same. This occurs at one angle. However, one can direct the transmitted signal towards any desired angle. This can be accomplished by adjusting the delay of one transmitted constant envelope signal. The delay can be adjusted by a feedback from the receiver to the transmitter. For instance, $X_{c2}(t)$ can be adjusted for phase, while keeping its amplitude constant. The phase adjustment can direct the transmitted signal to any desired angle by:

$$X_{TX1}(t)=X_{C1}(t)$$

$$X_{TX2}(t)=X_{C2}(t\text{-delay}(\theta))$$

$$X_{Rx}(t)=X_{C1}(t)+X_{C2}(t)=X(t).$$

In one embodiment, a phased array antenna system is used to transmit the decomposed, out-phased constant envelope signals. Typically, a phased array antenna system uses multiple antennas to transmit multiple RF signals. By incrementally adding delays to the individual transmit paths for each successive antenna, the phased array antenna system can point or steer a beam to the specific location of a receiver antenna. This beam forming functionality is desirable for security reasons. Furthermore, the directivity is advantageous because more RF power can be directed to the receiver antenna, which increases the distance by which data can be reliably transmitted. One can have such a transmitter with feedback from the receiver. The location information of the receiver is fedback to the transmitter so that the transmitter can adjust the delays to compensate for the location of that receiver. Feeding back the receiver location is performed for mobile or portable receiver applications. Alternatively, if the locations of the transmitter and receiver are fixed, the delays can be calculated based on the fixed locations and stored in the memory of the transmitter system. Location information can also be input from a user or downloaded from a network. Embodiments of the present disclosure can be applied to a phased array antenna system.

Figure 6:
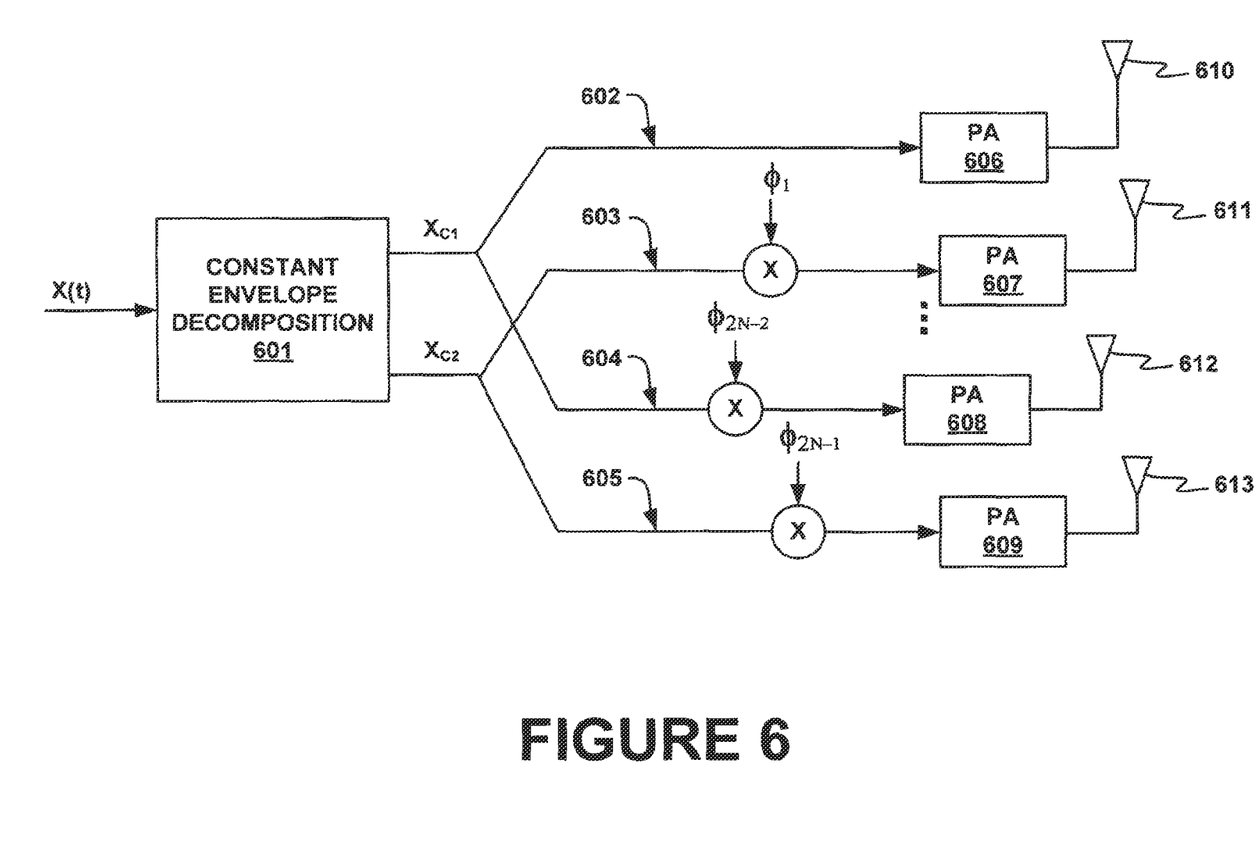
FIG. 6 shows a phased array antenna system for transmitting constant envelope signals decomposed from a variable envelope system.

For example, FIG. 6 shows a phased array antenna system for transmitting constant envelope signals decomposed from a variable envelope system. The variable envelope signal X(t) is input to the constant envelope decomposition block 601. The constant envelope decomposition block 601 decomposes the variable envelope signal X(t) into two constant envelope signals, $X_{C1}$ and $X_{C2}$, according to the out-phasing decomposition process described in detail above. After constant envelope decomposition, beam steering delays are introduced into the $X_{C1}$ and $X_{C2}$ signal paths before they are amplified by the power amplifiers. More specifically, one of the $X_{C1}$ signal paths 602 does not have any added beam steering delay. The $X_{C1}$ signal is input to power amplifier 606. Power amplifier 606 amplifies the $X_{C1}$ signal for RF transmission by transmitter antenna 610. The $X_{C1}$ signal is also transmitted over an additional N number of transmit paths in the phased array antenna system. For each of the N number of $X_{C1}$ paths, additional beam steering delays are added. The beam steering delays are incrementally larger for each successive $X_{C1}$ transmit path. The last transmit path 604 of the $X_{C1}$ signal has an added beam steering delay of $\phi_{2N-2}$. The $X_{C1}$ signal with the added beam steering delay of $\phi_{2N-2}$ is amplified by power amplifier 608 and then transmitted as an RF signal by antenna 612. In one embodiment, the $\Delta$ delays are incorporated into the phases (e.g., $\phi_1$–$\phi_{2N-2}$).

For the $X_{C2}$ signal, one of the transmit paths 603 has an added beam steering delay of $\phi_1$. The $X_{C2}$ signal that has the added beam steering delay of $\phi_1$ is input to power amplifier 607 which amplifies the signal before being transmitted over-the-air by antenna 611. The $X_{C2}$ signal is also transmitted over an additional N number of transmit paths in the phased array antenna system. For each of the N number of $X_{C2}$ paths, additional beam steering delays are added. The beam steering delays are incrementally larger for each successive $X_{C2}$ transmit path. The last transmit path 605 of the $X_{C2}$ signal has an added beam steering delay of $\phi_{2N-1}$. The $X_{C2}$ signal with the added beam steering delay of $\phi_{2N-1}$ is amplified by power amplifier 609 and then transmitted as an RF signal by antenna 613.

The phased array antenna system can have many transmit paths, power amplifiers, and transmitter antennas for transmitting the constant envelope signals. However, for purposes of illustration and explanation, only four of the multiple transmitter paths, power amplifiers, and transmitter antennas are shown in detail in FIG. 6. Increasing the number of transmit paths, power amplifiers, and transmitter antennas in the phased array antenna system increases its gain, thereby extending its transmit range. By selectively controlling the beam steering delays, the beam can be directed to any location corresponding to a receiver antenna. In other words, the beam can be electronically steered to a receiver antenna.

Figure 7:
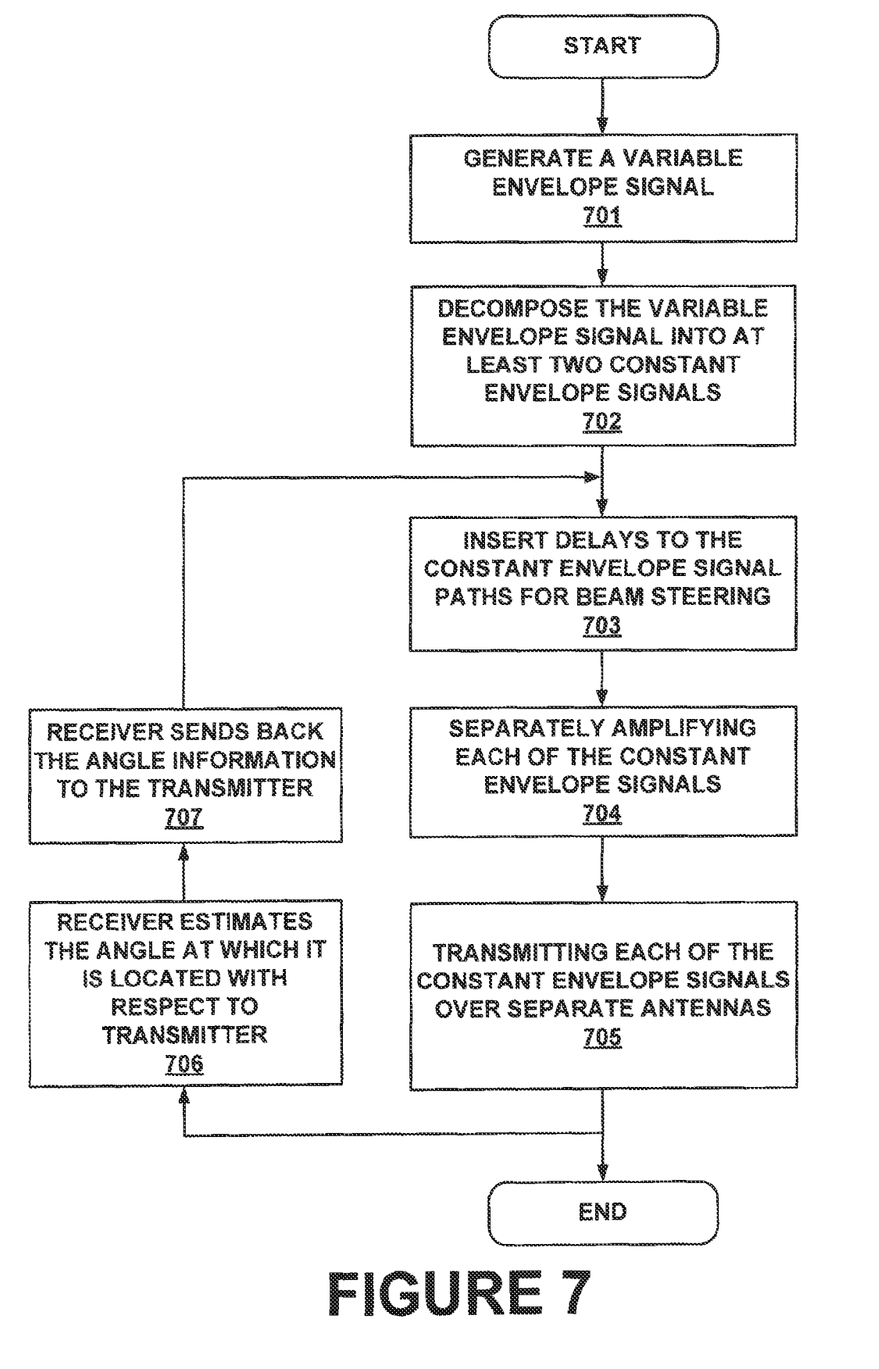
FIG. 7 is a flowchart describing the steps for the multi-antenna beam forming process for transmitting constant envelope signals decomposed from a variable envelope signal.

FIG. 7 is a flowchart describing the steps for the multi-antenna beam forming process for transmitting constant envelope signals decomposed from a variable envelope signal. Initially, in step 701, the variable envelope signal is generated. This variable envelope signal is decomposed into at least two constant envelope signals, step 702. The amplitudes of the constant envelope signals are kept constant, but their phases varies as a function of the amplitude and phase of the variable envelope signal. In step 703, one or more delays can be added to one or more of the transmit signal paths corresponding to one or both of the constant envelope signals. Step 703 is optional and is used to steer the beam to the known location of a receiver antenna. For implementation in a phased array antenna system, the delays are successively staggered for successive antennas. Once the delays, if any, have been added, in step 704, each of the transmit paths associated with the constant envelope signals are amplified by separate power amplifiers. The amplified constant envelope signals are then transmitted as RF signals from separate antennas in step 705. Since the decomposition works correctly for one angle, the transmitter needs to know the location of the receiver and hence, pre-compensate for that location. Therefore, a feedback from the receiver to the transmitter is implemented. This feedback is shown in steps 706 and 707. In step 706, the receiver estimates the angle at which it is located with respect to the transmitter. In step 707, the receiver sends back the angle information to the transmitter.

Figure 8:
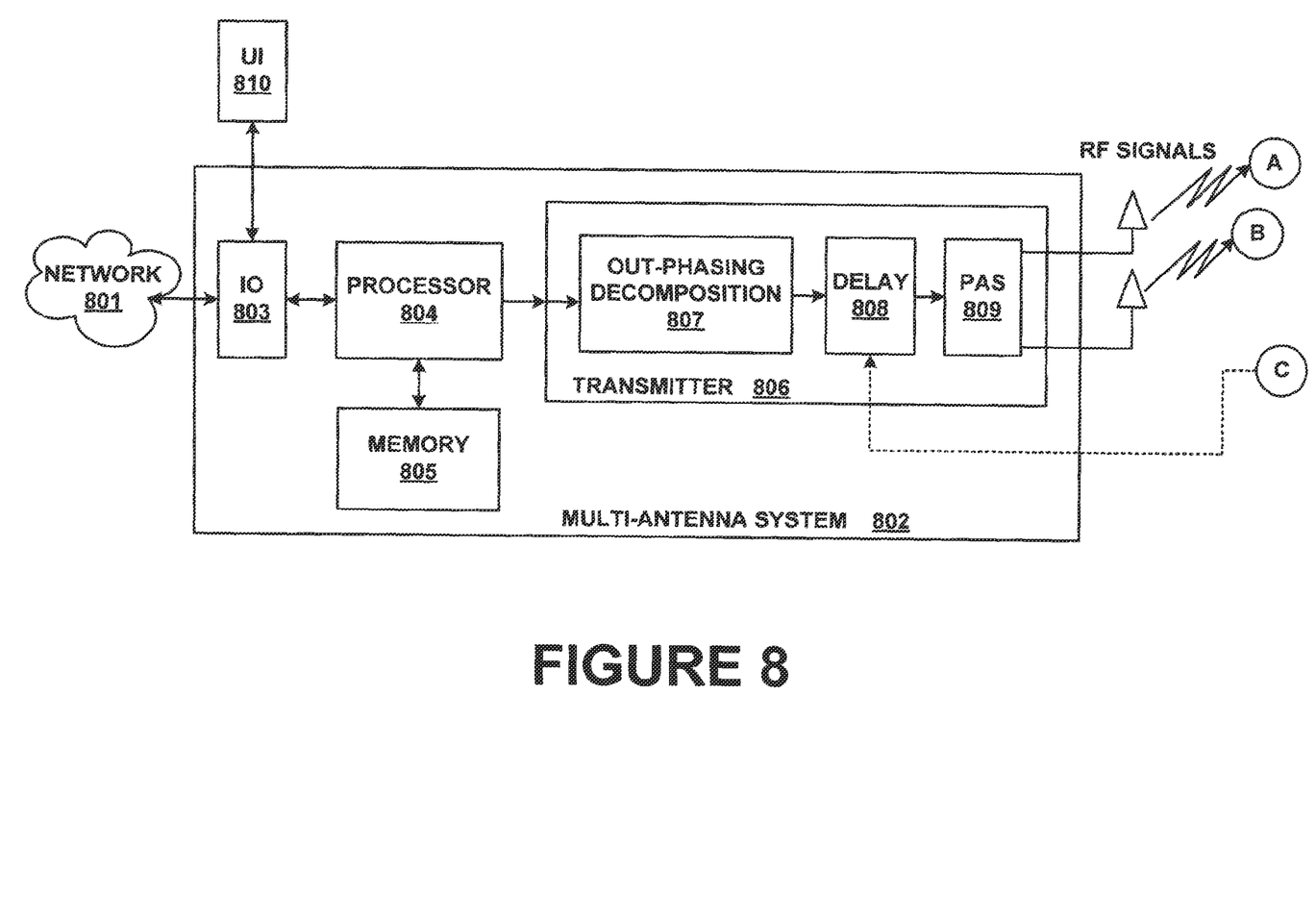
FIG. 8 shows a system diagram for an embodiment of a multi-antenna system for transmitting decomposed constant envelope signals.

FIG. 8 shows a system diagram for an embodiment of a multi-antenna system for transmitting decomposed constant envelope signals. The multi-antenna system 802 can send and receive data from a network 801 (e.g., the Internet) through an I/O interface 803. The I/O interface 803 is also coupled to a user interface 810 which enables users to input data and commands to the multi-antenna system 802 and also to obtain data for display from the multi-antenna system 802. Any data designated for transmission by transmitter 806 is initially processed as a variable envelop signal. The data can originate as input from a user through UI 810, obtained through the network 801, read from memory 805, or generated by processor 804. The variable envelope signal is then processed by out-phasing decomposition block 807 which outputs constant envelope signals. Delays are added in block 808 to certain ones of the constant envelope signals for purposes of bean steering. The constant envelope signals are then amplified by power amplifiers in block 809. The amplified constant envelope signals are steered and transmitted over-the-air to one or more receiving antennas. An example of a receiving system is shown as 811. The receiving system 811 has a receiver 812, which is designed to receive and demodulate variable envelope signals. A processor 813 processes the received data. The data can then be stored in memory 814 or sent out via I/O interface 815 for display or playback on user interface 817 or sent over a network 816. Furthermore, the processor 813 of receiving station 811 can send location information back to the transmitter 806 of multi-antenna system 802. This location information is used to adjust the delays of delay circuit 808 to compensate for the location of receiving system 811. This information can be sent back wirelessly, especially for mobile or portable receiver applications. Alternatively, the location information can be input by the user, stored in memory, or downloaded from a network or server.

In one embodiment, the multi-antenna system directly generates the constant envelope signals without having to actually generate any variable envelope signal. The constant envelope signals are modeled after an imaginary or virtual variable envelope signal. It should be noted that this system supports any type of point-to-point or multicast data communications. The distance between the transmitter and receiver can be as short as ten times the distance between the transmitter antennas and can be as far away as practically supported by the power amplifiers and number of antennas. Any type of variable envelope signals (e.g., Differential Quadrature Phase Shift Keying, spread spectrum signals, etc.) and any type of constant or near-constant envelope signals (e.g., Frequency Shift Keying, Orthogonal Frequency Division Multiplexing, etc.) can be used in various embodiments of the multi-antenna system. Furthermore, the multi-antenna system is not limited by frequency; it can work in any frequency range. In addition, the multi-antenna system can be used in a wide range of different applications (e.g., as a repeater, for transmitting television signals including high definition, high-speed digital data link, audio/voice/cellular communications, etc.).

In conclusion, a multi-antenna beam forming system for transmitting constant envelope signals decomposed from a variable envelope signal is disclosed. In the foregoing specification, embodiments of the claimed subject matter have been described with reference to numerous specific details that can vary from implementation to implementation. Thus, the sole and exclusive indicator of what is, and is intended by the applicants to be the claimed subject matter is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A phased-array antenna system, comprising:
    a decomposition circuit for decomposing a variable envelope signal into at least a first constant envelope signal $x_{c1}$ and a second constant envelope signal $x_{c2}$;
    an interconnection network which splits $x_{c1}$ into a first set of N signals, and splits $x_{c2}$ into a second set of N signals, and alternates the first and second sets of signals to form a third set of 2N signals;
    a set of delay circuits coupled to the third set of 2N signals, wherein the set of delay circuits applies incrementally increasing or decreasing beam-steering delays to the third set of 2N signals;
    a set of 2N amplifiers to amplify the delayed third set of signals; and
    a set of 2N antennas to transmit the delayed and amplified third set of signals.

2. The phased-array antenna system of claim 1, wherein each delay circuit in the set of delay circuits comprises at least one mixer which adds a phase delay to a transmit path of one of the first constant envelope signal and the second constant envelope signal.

3. The phased-array antenna system of claim 1, wherein the first constant envelope signal and the second constant envelope signal have phases that when transmitted as RF signals combine at a receiving antenna to form the variable envelope signal.

4. The phased-array antenna system of claim 1, wherein each amplifier in the set of amplifiers comprises a power amplifier operating in saturation.

5. A method for transmitting signals through a phased-array antenna system, comprising:
    decomposing a variable envelope signal into a first constant envelope signal $x_{c1}$ and a second constant envelope signal $x_{c2}$;
    splitting $x_{c1}$ into a first set of N signals;
    splitting $x_{c2}$ into a second set of N signals;
    alternating the first and second set of signals to form a third set of 2N signals;

applying incrementally increasing or decreasing beam-steering delays to the third set of signals;

amplifying the delayed third set of signals through a set of 2N amplifiers; and transmitting the delayed and amplified third set of signals through a set of 2N antennas.

6. The method of claim 5, wherein applying the incrementally increasing or decreasing delays to the third set of signals comprises adding beam steering delays to the third set of signals to direct a beam from the set of antennas to a location of a receiver antenna.

7. The method of claim 5, wherein decomposing the variable envelope signal comprises spatially out-phasing the variable envelope signal to produce the first constant envelope signal $x_{c1}$ and the second constant envelope signal $x_{c2}$, wherein $x_{c1}$ and $x_{c2}$ combine through superposition as RF signals to produce an RF signal at a receiver antenna corresponding to the variable envelope signal.

8. A phased-array antenna system for transmitting constant envelope signals decomposed from a variable envelope signal, comprising:

a processor for generating the variable envelope signal having varying amplitudes and varying phases;

an out-phasing decomposition circuit coupled to the processor that generates at least a first constant envelope signal $x_{c1}$ and a second constant envelope signal $x_{c2}$, wherein $x_{c1}$ and $x_{c2}$ have constant amplitudes and varying phases which together represent the variable envelope signal;

an interconnection network which splits $x_{c1}$ into a first set of N signals, and splits $x_{c2}$ into a second set of N signals, and alternates the first and second set of signals to form a third set of 2N signals;

a set of delay circuits coupled to the third set of 2N signals, wherein the set of delay circuits applies incrementally increasing or decreasing beam-steering delays to the third set of 2N signals;

a set of 2N amplifiers to amplify the delayed third set of signals; and a set of 2N antennas to wirelessly transmit the delayed third set of signals.

9. The phased-array antenna system of claim 8, wherein the offset of delay circuits include a plurality of adders for adding the delays to the first constant envelope signals and the second constant envelope signals.

10. The phased-array antenna system of claim 8, wherein the set of delay circuits, set of amplifiers, and the set of antennas comprise a phased-array antenna system that electronically steers a beam to a location of a receiver.

11. The phased-array antenna system of claim 8, wherein the wireless transmission of the first constant envelope signal and the wireless transmission of the second constant envelope signal combine as RF signals.

12. The phased-array antenna system of claim 8, wherein the wireless transmission of the first constant envelope signal and the wireless transmission of the second constant envelope signal is capable of being received by a variable envelope signal receiver.

13. The phased-array antenna system of claim 8, wherein the wireless transmission of the first constant envelope signal and the wireless transmission of the second constant envelope signal establishes point-to-point communications with a receiver.

* * * * *